Nov. 29, 1955   J. A. BOVA   2,725,208
TANK HOSE CLAMP
Filed May 27, 1952

INVENTOR
Joseph Anthony Bova

… (United States Patent Office)

2,725,208

TANK HOSE CLAMP

Joseph Anthony Bova, Pittsburgh, Pa.

Application May 27, 1952, Serial No. 290,219

2 Claims. (Cl. 248—89)

The invention relates to a holding device to be used for storing, in a protective condition, a hose and a nozzle which is attached to a tank.

I have found that workmen who use liquid or gas containing tanks, in the course of their duties in such work as in plumbing, welding, refrigeration, air conditioning, tinning, and electrical work, and in other types of work where a tank is used, find it difficult to store the hose and to protect the nozzle when the tank is not in use. This problem is especially evident when the tank with hose and nozzle attached, is to be carried or transported to some other part of the job or some other place, then, both hose and nozzle which are suspended loosely from the tank are subject to considerable damage. Moreover, much inconvenience is experienced by workmen since the tank is difficult to manage and the loose, dangling hose could even be an accident hazard.

Damage to both hose and nozzle is completely eliminated by my invention and costly replacements are prevented. Therefore my invention is to provide a holding device which is to be used as an accessory to a tank for the purpose of storing a hose and nozzle in a safe condition when the tank is not in use or when the tank and attached hose and nozzle are transported or carried from place to place. Then too, this holding device will eliminate an accident hazard to persons handling such tanks.

The objects of my invention are attained by a device, which when clamped around a tank, is capable of storing and holding a hose. This holding device is further provided with a slotted socket to be used for the purpose of receiving and protecting a curved nozzle attached to the end of a hose. The slot located in one of the side walls of the socket makes it possible for a curved nozzle to extend through the slot and holding the nozzle fast.

I attain the objects, advantages and usefulness of my invention by the device illustrated in the accompanying drawings in which.

The details of several views show that like numerals are to indicate like parts.

Figure 1:
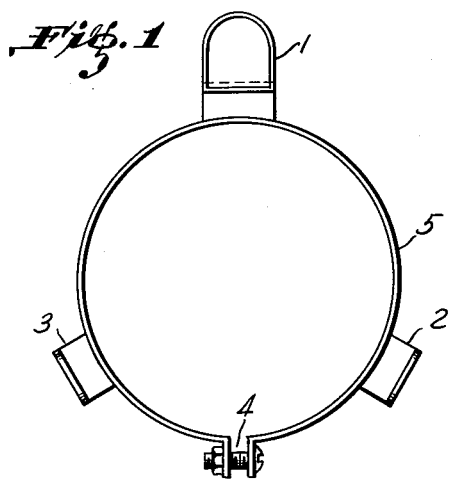
Fig. 1 is a top plan view of the invention.
Figure 3:
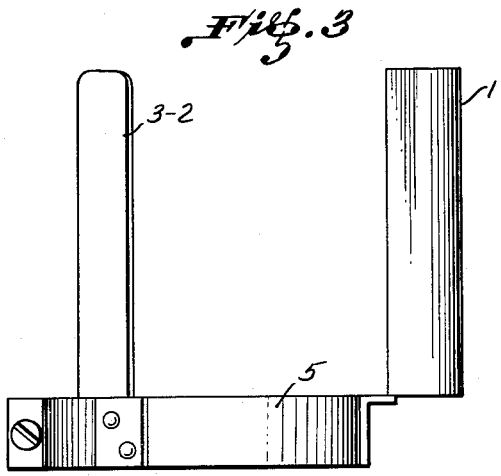
Fig. 3 is a side elevational view of the invention.
Figure 2:
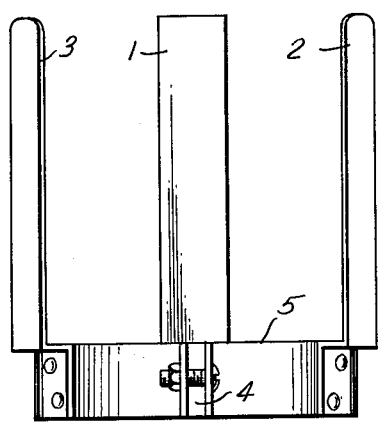
Fig. 2 is a rear elevational view of the invention.
Figure 4:
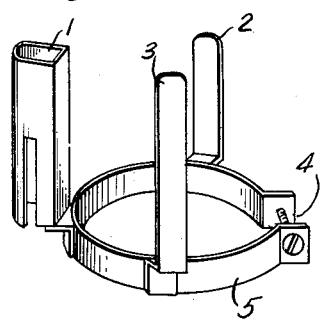
Fig. 4 is a perspective view of the invention.
Figures 5, 6:
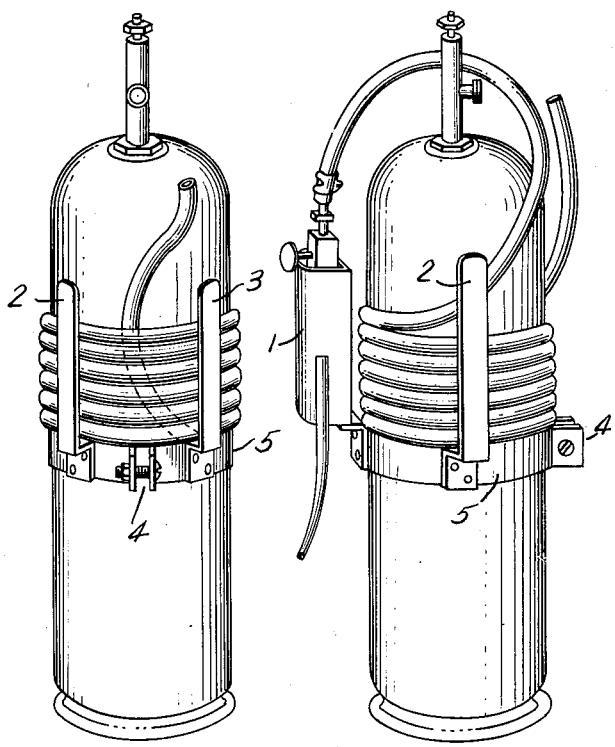
Figs. 5 and 6 are perspective views of the device in use.

By making reference to the drawings the details show that a split collar 4 made of an arcuate strip 5 of the flexible material, the ends of split collar 4 are extended outwardly at right angles to collar 4 and provisions made for the insertion of a nut and bolt so as to draw the extended out turned ends toward each other and constricting the collar when placed around a cylindrical object. A plurality of fingers 2 and 3 are attached by means of rivets or by spot welding to the split collar 4. These fingers 2 and 3 are so constructed as to extend from the split collar 4 in a direction substantially parallel to the axis of the split collar 4. Fingers 2 and 3 are to have an offset which is outwardly from collar 4, in this manner the collar 4 may be removably clamped to a cylindrical tank and a coiled hose which is attached to a tank may be held and stored between fingers 2 and 3 and the walls of a tank. My invention has a further usefulness by having mounted on split collar 4 by means of rivets or by spot welding a cylindrical socket 1. Socket 1 is so constructed as to extend from the collar 4 in a direction substantially parallel to the axis of the collar. Socket 1 is also to have an offset which is outwardly from the split collar 4 so as to give the same service as fingers 2 and 3, that is, to aid in holding and storing a coiled hose. Moreover, cylindrical socket 1 is to have the additional feature of receiving and protecting a nozzle placed within it. The cylindrical socket 1 is provided with a slot in one of its side walls parallel to the axis of socket 1 so as to receive a curved nozzle with a portion of the nozzle extending through the slot as shown in Fig. 6.

The device is applicable to any tank with a hose and nozzle attached.

My description and illustrations are a preferred embodiment of my invention, it is to be understood that such description and illustrations are not to be taken in a limiting sense and that modifications coming within the scope of the appended claims are to be considered as embodiments of the spirit of my invention.

I claim:

1. In a device of the class described, a split collar, said collar comprising an elongated, arcuate strip of flexible material, means connected with the ends of said strip for drawing said ends toward each other and constricting said collar, a plurality of fingers extending from the collar in a direction substantially parallel to the axis of said collar, said fingers being offset outwardly from said collar whereby said collar may be removably clamped to a cylindrical object and a coiled hose may be stored between said fingers and said cylindrical object, and a socket attached to said band for receiving and protecting a nozzle on said hose said socket being offset outwardly from said collar.

2. The device of claim 1 in which the nozzle receiving socket is a cylinder and is provided with a slot in one of its side walls parallel to the axis of said socket whereby a curved nozzle may be received in the socket with a portion of said nozzle extending through the slot.

description and illustrations are not to be taken in a

References Cited in the file of this patent

UNITED STATES PATENTS

| | | |
|---|---|---|
| 934,123 | Wurnfeld et al. | Sept. 14, 1909 |
| 2,313,423 | Dodd | Mar. 9, 1943 |
| 2,384,174 | Jones | Sept. 4, 1945 |
| 2,427,801 | McKee | Sept. 23, 1947 |
| 2,572,353 | Kilgore | Oct. 23, 1951 |